United States Patent [19]

Link, Jr. et al.

[11] Patent Number: 5,048,330
[45] Date of Patent: Sep. 17, 1991

[54] MATERIALS TESTING MACHINE

[76] Inventors: Gary G. Link, Jr., 5821 Lorelie Ave.; Steve Quinn, 5319 Autry Ave., both of Lakewood, Calif. 90712

[21] Appl. No.: 478,578

[22] Filed: Feb. 12, 1990

[51] Int. Cl.$^5$ .......................................... G01M 19/00
[52] U.S. Cl. ............................................ 73/168; 73/37
[58] Field of Search .................................. 73/168, 37

[56] References Cited

U.S. PATENT DOCUMENTS

| | | | |
|---|---|---|---|
| 2,612,777 | 10/1952 | Greer | 73/168 |
| 4,255,967 | 3/1981 | Grymonprez et al. | 73/168 |
| 4,722,221 | 2/1988 | Ferguson | 73/168 |

Primary Examiner—Daniel M. Yasich
Attorney, Agent, or Firm—Edgar W. Averill, Jr.

[57] ABSTRACT

A materials testing machine for testing equipment used for lifting or jacking up of objects. The machine has a frame with a generally horizontal arm extending outwardly therefrom. A hydraulic cylinder assembly is positioned along the horizontal arm and is connected to a pressure gauge. Lifting equipment may be connected between the frame of the machine and the end of the horizontal arm, and the amount of pressure exerted by the lifting equipment may be tested and the results read on the gauge thereof. A second hydraulic cylinder may be positioned over the platform so that a lifting jack may be similarly tested.

3 Claims, 2 Drawing Sheets

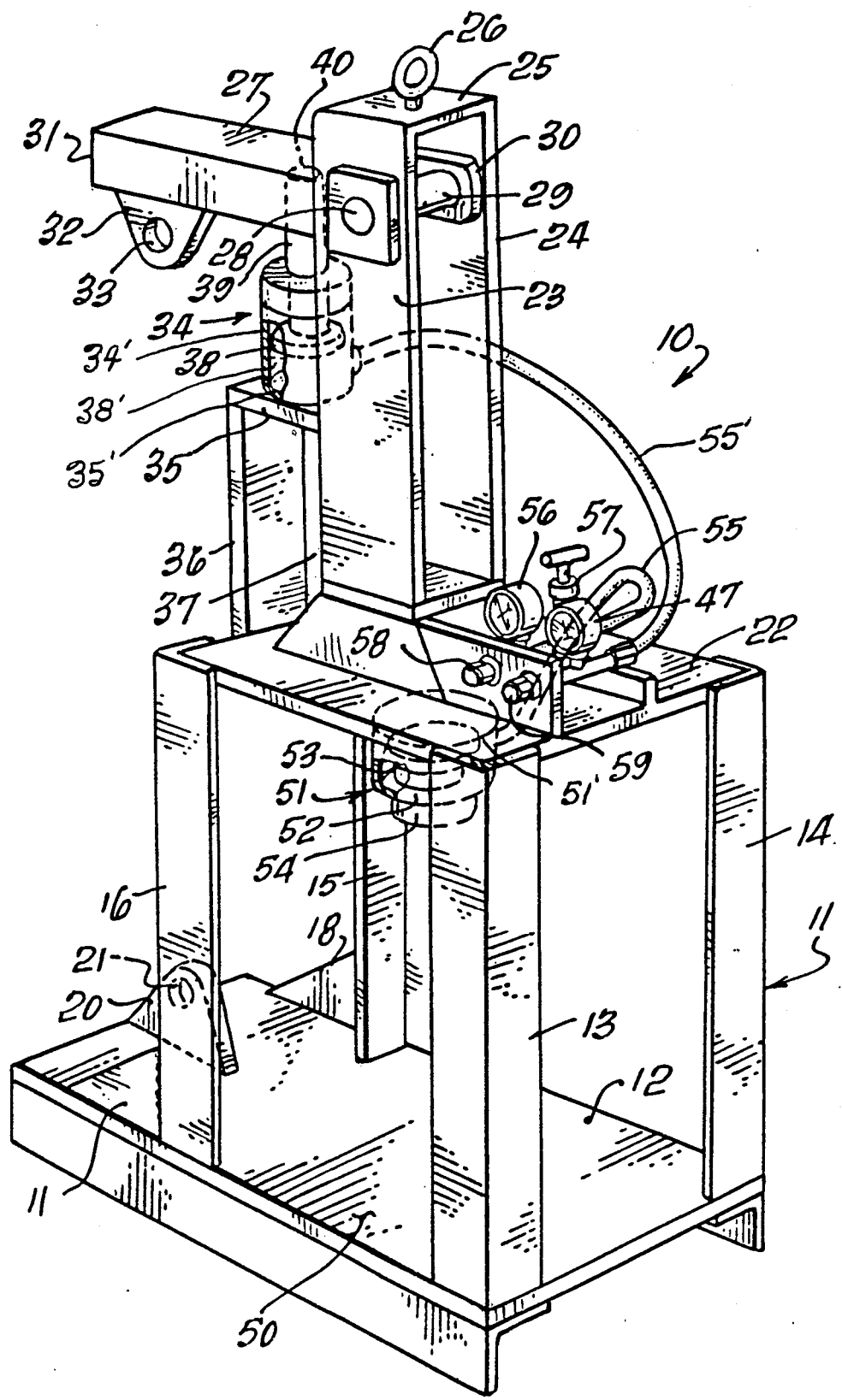

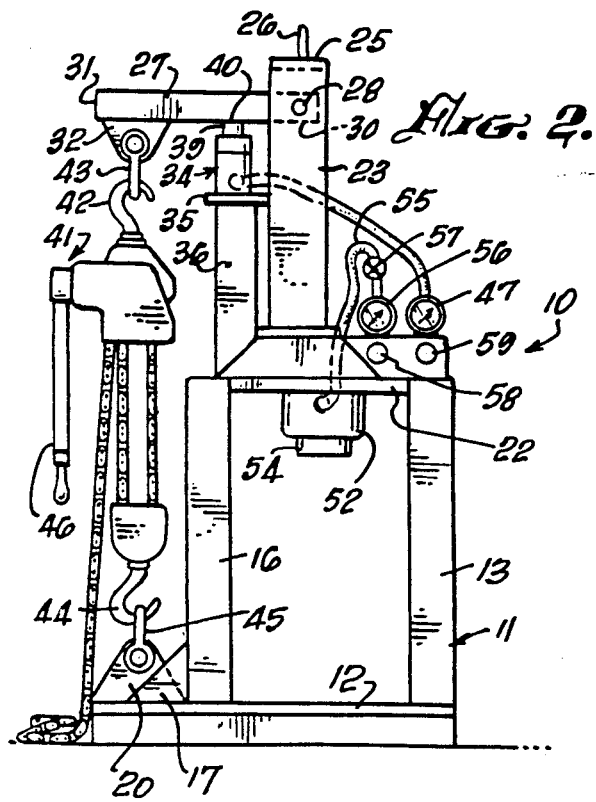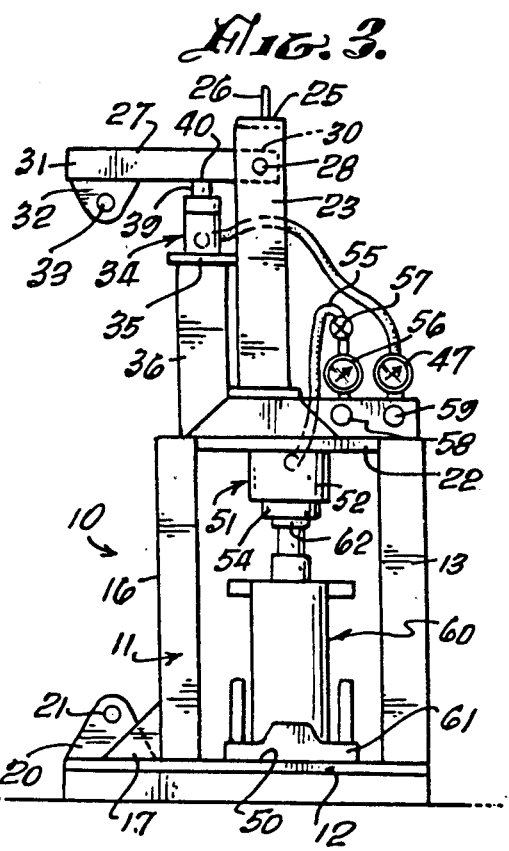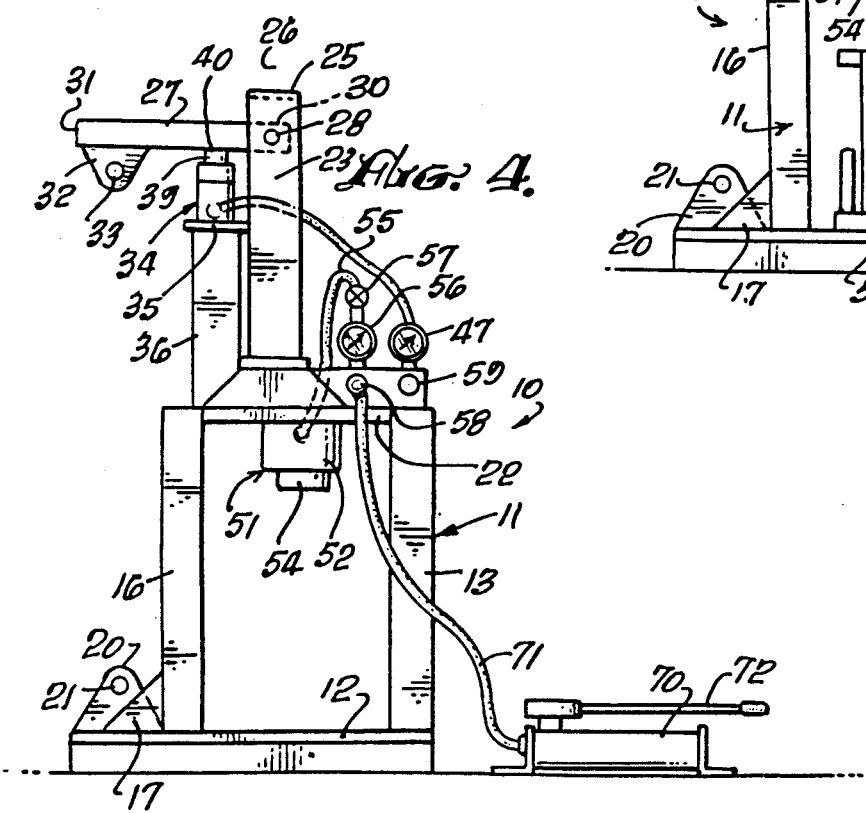

MATERIALS TESTING MACHINE

BACKGROUND OF THE INVENTION

The field of the invention is testing equipment, and the invention relates more particularly to testing equipment of the type useful for testing lifting apparatus or jacking apparatus.

The typical hydraulic testing machine includes an elaborate array of attachments which includes a hydraulic pump which can be used to exert a predetermined or ever increasing pressure on the apparatus to be tested.

For many applications, the only testing which is required is to test a lifting unit of the type often referred to as a "come along" in the oil field industry. It is very important for safety reasons that such come alongs be periodically tested since they include a clutch which, if defective, can cause the machine to fail. Such failure can have disastrous consequences and, thus, companies typically send out the come along for periodic testing. While the user could purchase the conventional hydraulic testing machine, such testing machine is an extremely expensive piece of equipment and actually contains far more features than are necessary for the purpose of testing lifting gear. Similarly, hydraulic jacks and hydraulic pumps should be periodically tested, and a low cost method for such testing is needed.

SUMMARY OF THE INVENTION

It is an object of the present invention to provide a low-cost unit for accurately testing lifting or jacking apparatus with a high degree of reliability.

The present invention is for a materials testing machine for testing equipment used for lifting or jacking up objects. The testing machine comprises a machine frame having a base and a vertical arm, and the machine frame includes an equipment attachment point. A generally horizontal arm having an inner end and an outer end is pivotally attached near its inner end to the vertical arm of the machine frame. The generally horizontal arm has an equipment attachment point near its outer end. A hydraulic cylinder assembly including a cylinder having a base, a piston and a piston rod extending outwardly from the cylinder, and a hydraulic hose extending outwardly from the cylinder between the base and the piston is supported by the frame and contacts the generally horizontal arm at a point intermediate between its pivot point and the equipment attachment point. Hydraulic fluid is contained within the hydraulic cylinder and hose. At least one pressure gauge is connected to the hydraulic hose, and the materials testing machine is free from any hydraulic pump and, instead, obtains its motive force from the equipment being tested. The hydraulic testing machine may include a second hydraulic cylinder assembly which is positioned above a jack testing platform supported by the frame. This second hydraulic cylinder assembly also has a hydraulic hose which is connected to a second pressure gauge. One of the hydraulic hoses may include a shut-off valve, and a hydraulic fitting may be positioned to the pressure gauge to which the hydraulic hose with the shut-off valve is attached. This permits the pressure gauge to be used for testing a hydraulic pump.

BRIEF DESCRIPTION OF THE DRAWINGS

FIG. 1 is a perspective view of the materials testing machine of the present invention.

FIG. 2 is a side view showing the materials testing machine of FIG. 1 testing a come along.

FIG. 3 is a side view of the materials testing machine of FIG. 1 shown testing a hydraulic jack.

FIG. 4 is a side view of the materials testing machine of FIG. 1 shown testing a hydraulic pump.

DESCRIPTION OF THE PREFERRED EMBODIMENTS

The materials testing machine is shown in perspective view in FIG. 1 and indicated by reference character 10. Testing machine 10 has a frame generally indicated by reference character 11 which has a base 12 and four vertical arms 13, 14, 15 and 16. Arms 15 and 16 are supported to base 12 by gussets 17 and 18, respectively. An equipment attachment plate 20 is affixed to base 12 and includes an opening 21 which provides an equipment attachment point. An upper platform 22 is supported by legs 13, 14, 15 and 16 and, in turn, supports a pair of vertical arms 23 and 24 which are connected at the top by a plate 25 which includes a lifting ring 26. A generally horizontal arm 27 is pivotally attached at 28 and pivots about a rod 29 positioned near the inner end 30 of generally horizontal arm 27. Arm 27 has an outer end 31, and an equipment attachment plate 32 is affixed near outer end 31 and includes an opening 33 which provides an equipment attachment point. A hydraulic cylinder assembly 34 rests on a plate 35 supported by a pair of vertical arms 36 and 37. Hydraulic cylinder assembly 34 includes a cylinder 34' having a base 35' a piston 38 and a piston rod 39 which contacts generally horizontal arm 27 at an intermediate point 40 between the pivotal attachment point 28 and the equipment attachment point 33. A hydraulic hose 55' connects the hydraulic fluid 38' in cylinder 34' to pressure gauge 47.

As shown in FIG. 2, a come along 41 has an upper hook 42 which is connected through a shackle 43 to plate 32. Lower hook 44 of come along 41 is attached through a shackle 45 to lower equipment attachment plate 20. As the handle 46 of come along 41 is manipulated, upper hook 42 is drawn toward lower hook 44 thus exerting pressure on hydraulic cylinder assembly 34 causing first pressure gauge 47 to register the pressure within hydraulic cylinder assembly 34. Once the desired test pressure has been reached, it is determined that the come along is capable of reaching this test pressure. Next, a timed interval is determined by conventional timing procedures, and a second reading of the pressure gauge 47 is made. If the come along 41 is not slipping, the pressure gauge will not have dropped significantly. Thus, it can be seen that a relatively inexpensive testing machine may accurately and conveniently test come along 41 to assure its safety for the intended purpose.

Returning now to FIG. 1, base 12 also includes a jack testing platform 50 and a jack testing hydraulic cylinder assembly 51 which includes a cylinder 52, a piston 53 and a piston rod 54. Hydraulic cylinder assembly 51 includes a hydraulic hose 55 which is connected to a second pressure gauge 56. Hydraulic hose 55 also includes a shut-off valve 57 which may be operated as described below to test a hydraulic pump. A pair of capped hydraulic fittings 58 and 59 are used not only to fill the system with hydraulic fluid, but also may be used as described below for testing a hydraulic pump.

FIG. 3 shows the materials testing machine 10 as used to test a hydraulic jack. A hydraulic jack 60 has its base 61 resting on jack testing platform 50 and its lifting arm platform 62 contacting a piston rod 54 of jack testing hydraulic cylinder assembly 51. In use, the shut-off valve 57 is opened, and jack 60 is pumped upwardly until second pressure gauge 56 reaches a predetermined test pressure. Once again, the jack is maintained at the predetermined test pressure for a timed period, and any reduction in pressure is noted.

Lastly, the materials testing machine 10 is also capable of testing a hydraulic pump. This is accomplished as shown in FIG. 4 by turning off shut-off valve 57 and connecting pump 70 through a hydraulic line 71 to hydraulic fitting 58. Pump 70 is then manipulated to a predetermined test pressure by working its handle 72 until pressure gauge 56 reaches a predetermined test pressure. Once again, a timed interval is waited, and the test pressure is again noted for any decrease in pressure.

It can be seen that the materials testing machine of the present invention provides a very reasonably priced apparatus for testing a variety of lifting and pumping equipment. This is accomplished by using the force of the apparatus being tested to provide the motive force for the testing machine.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A materials testing machine for testing equipment used for lifting or jacking up equipment, said testing machine comprising:
    a machine frame having a base and a vertical arm assembly, said machine frame including an equipment attachment point;
    a generally horizontal arm having an inner end and an outer end, said generally horizontal arm being pivotally attached at a pivotal attachment point near its inner end to said vertical arm assembly and said generally horizontal arm having an equipment attachment point near its outer end;
    a hydraulic cylinder assembly including a cylinder having a base, a piston and a piston rod extending outwardly from said cylinder and a hydraulic hose extending outwardly from said cylinder at a point between said base and said piston, said base of said cylinder assembly being supported on a plate supported by the machine frame and its piston rod being in contact with an intermediate point of said generally horizontal arm between the pivotal attachment point of the generally horizontal arm and the equipment attachment point of said generally horizontal arm;
    hydraulic fluid within said hydraulic cylinder and said hydraulic hose; and
    at least one pressure gauge connected to said hydraulic hose, said materials testing machine being free from any hydraulic pump and said materials testing machine instead obtaining its motive force from the equipment being tested.

2. The materials testing machine of claim 1 further including a jack testing platform supported by the base of the frame and a second hydraulic assembly also having a cylinder assembly being a jack testing cylinder assembly having a hydraulic cylinder including a base, a piston and a piston rod extending outwardly from said hydraulic cylinder and a hydraulic hose extending outwardly from said hydraulic cylinder at a point between said base and said piston, said cylinder assembly being attached between its base and its piston rod between said frame and positioned above said jack testing platform, and said hydraulic hose of said jack testing cylinder assembly being attached to a second pressure gauge, said second pressure gauge being a jack pressure gauge.

3. The materials testing machine of claim 2 further including a shut off valve in one of said hydraulic hoses and a hydraulic fitting attached to the pressure gauge which is connected to the said one of said hydraulic hoses including the shut-off valve whereby a hydraulic pump may be tested by attachment to said hydraulic fitting and closing said shut off valve.

* * * * *